United States Patent
Little

(10) Patent No.: US 11,036,768 B2
(45) Date of Patent: Jun. 15, 2021

(54) SCALABLE CAPTURING, MODELING AND REASONING OVER COMPLEX TYPES OF DATA FOR HIGH LEVEL ANALYSIS APPLICATIONS

(71) Applicant: LeapAnalysis Inc., Melbourne, FL (US)

(72) Inventor: Eric Little, Indialantic, FL (US)

(73) Assignee: LEAPANALYSIS INC., Melbourne, FL (US)

( * ) Notice: Subject to any disclaimer, the term of this patent is extended or adjusted under 35 U.S.C. 154(b) by 224 days.

(21) Appl. No.: 16/014,791

(22) Filed: Jun. 21, 2018

(65) Prior Publication Data

US 2019/0392074 A1 Dec. 26, 2019

(51) Int. Cl.
| | |
|---|---|
| *G06F 16/28* | (2019.01) |
| *G06F 16/21* | (2019.01) |
| *G06F 16/245* | (2019.01) |
| *G06F 16/25* | (2019.01) |
| *G06F 16/22* | (2019.01) |
| *G06F 16/901* | (2019.01) |
| *G06N 20/00* | (2019.01) |

(52) U.S. Cl.
CPC .......... *G06F 16/288* (2019.01); *G06F 16/212* (2019.01); *G06F 16/2282* (2019.01); *G06F 16/245* (2019.01); *G06F 16/258* (2019.01); *G06F 16/9024* (2019.01); *G06N 20/00* (2019.01)

(58) Field of Classification Search
CPC .................................................... G06F 16/288
See application file for complete search history.

(56) References Cited

U.S. PATENT DOCUMENTS

2011/0225167 A1* 9/2011 Bhattacharjee ....... G06F 16/284
707/747
2013/0291019 A1* 10/2013 Burkitt ............... H04N 21/4828
725/53

(Continued)

OTHER PUBLICATIONS

Abadi et al., "SW-Store: a vertically partitioned DBMS for Semantic Web data management", 2008 (Year: 2008).*

(Continued)

*Primary Examiner* — Dawaune A Conyers
(74) *Attorney, Agent, or Firm* — Steven M. Greenberg, Esq.; Shutts & Bowen LLP

(57) ABSTRACT

The scalable high-level fusion of structured and unstructured data includes ingesting and processing unstructured data to produce a statistical model stored as extracted entities then mapped to a collection of resource description framework (RDF) triples, and applying a semantic analysis to a set of structured data to produce a logical model stored as a collection of triples. Reasoners are applied to both models generating an extended knowledge graph of both base and inferred knowledge that is decomposed into a wide table database, with each row storing a corresponding triple, and a reasoner converting the RDF triples into associated triples by adding a new column to the database in response to detecting a new predicate for a subject already present in one of the rows of the database so that the new predicate is stored in the new column in a new row created for the subject already present.

15 Claims, 2 Drawing Sheets

(56) References Cited

U.S. PATENT DOCUMENTS

| | | | |
|---|---|---|---|
| 2014/0279855 A1* | 9/2014 | Tan ..................... | G06F 16/273 |
| | | | 707/609 |
| 2015/0039984 A1* | 2/2015 | Asano .................... | G06F 40/18 |
| | | | 715/209 |
| 2017/0060542 A1* | 3/2017 | Mandal ................. | G06F 9/4488 |
| 2018/0239817 A1* | 8/2018 | Kepeklian ........... | G06F 16/9566 |
| 2019/0354544 A1* | 11/2019 | Hertz ................... | G06F 16/338 |

OTHER PUBLICATIONS

Yan Jia, et al.,"A Practical Approach to Constructing a Knowledge Graph for Cybersecurity," Engineering, vol. 4, No. 1, Feb. 1, 2018.
Kate Byrne,"Populating the Semantic Web Combining Text and Relational Databases as RDF Graphs," Thesis Uni of Edinburgh, Jan. 1, 2009.
Heiko Paulheim, "Knowledge Graph Refinement: A Survey of Approaches and Evaluation Methods," Semantic Web, vol. 8, No. 3, Dec. 6, 2016.
Faye, et al., "A Survey of RDF Storage Approaches," Revue Africaine de la Recherche, Jan. 2012.

\* cited by examiner

SCALABLE CAPTURING, MODELING AND REASONING OVER COMPLEX TYPES OF DATA FOR HIGH LEVEL ANALYSIS APPLICATIONS

BACKGROUND OF THE INVENTION

Field of the Invention

The present invention pertains to data analytics and more particularly to semantic data analysis and knowledge graph utilization in big data semantics.

Description of the Related Art

Semantics-based data science refers to the representation of data in both its logical and statistical forms combined. Logical annotation and classification is combined with statistics to more completely describe entities, relationships and patterns of interest. The foregoing technique can be used for unstructured data, such as text-based data, as well as relational data in one or more graph-based formats so that graph matching or graph-based reasoning can be applied to the data in order to infer relationships between the data and to draw conclusions therefrom.

The graph-based format of a semantic model exposes the logical underpinnings of data in the graph so as to permit the application of axiomatic constraints and deductive and inductive reasoning to draw conclusions regarding the data of the graph. To that end, semantic technologies have proven useful for capturing, modeling and reasoning over complex types of data pertinent to the high-level fusion of the data. Ultimately, the fusion of complex types of data permits the growth of the underlying data set itself through the inference of new data from the raw data of the data graph. New data can be derived therefore from both logical as well as mathematical patterns.

Structured data, oftentimes, is processed through direct observation in a data store, in which conclusions are drawn based upon the statistical analysis of the data in the data store. The outcome of statistical modeling of data generally is a number of different statistical models from which predictions may be made regarding subsequently observed instance-level data. Statistical models permit scalability, though statistical models face significant challenges in describing, labeling and annotating data in human-centric terms, using basic concepts. Algorithms normally contain features that are computed against, but those features are not well described, limiting their communication ability and general reuse over time.

Likewise, semantic models, while essential to the growth of knowledge from a raw data set, lack scalability in the circumstance where complex queries are applied against numerous large models, or where there is an overabundance of instance-level data, which together can compose graph-based triples of the form subject-predicate-object. In this regard, semantic models provide a classification framework that formally structures data at a higher conceptual level pertaining to metadata structures, allowing for integration of instance-level data sources to be achieved through the utilization of advanced queries/rules, capable of reaching back into numerous disparate databases where the instance data resides. Graph-based queries can interrogate data in a complex manner by assessing connections between various disparate data nodes. Performance in these types of applications has been notoriously abysmal, resulting in query wait times of hours to days to complete, if at all. Recent advances in graph databases and large-scale triple stores have proven to alleviate some of these issues by providing capabilities for storing and querying graphs composed of billions of triples. However, scalability is still a challenge, even at that level.

BRIEF SUMMARY OF THE INVENTION

Aspect of the invention address the deficiencies of the state of the art described herein and provide for a novel and non-obvious method, system and computer program product for the scalable high-level integration of structured and unstructured data. A method of the invention includes the ingesting unstructured data and the processing of the ingested data to produce a semantic model stored as a collection of resource description framework (RDF) triples in a computer data processing system. The method also includes applying a statistical analysis by a processor of the computer data processing system to the unstructured data in a database or file-based system to produce a statistical model of the content combined with logical classifiers mapped to the RDF graph. Structured data can be mapped via their underlying database schemas to the RDF model and captured as triples. Thereafter, using the logical classifications, subsequent statistical processing can utilize those semantic features within corresponding statistical algorithms. Results are stored as a collection of triples and then mapped to a wide column table. Optionally, the results are broken into tuples if stored as entity-value pairs as is the case in a tall table.

The method yet further includes the application of one or more reasoners to the semantic model and the statistical model in order to generate a wide or tall table database of a multiplicity of rows and columns, with each row storing a corresponding triple or tuple. Notably, at least one of the reasoners converts the RDF triples of the semantic model into an associated new column to the wide table database in response to detecting a new predicate for a subject already present in one of the rows of the wide table database so that the new predicate is stored in the new column in a new row created for the subject already present. Finally, the method includes processing queries by the processor of the computer data processing system against the wide table database as received in a user interface to the wide table database.

A system of the invention includes a multiplicity of computers, each with memory and at least one processor, a database management system storing a wide table database of a multiplicity of rows and columns, each row storing a corresponding triple or tuple, and an integration module comprising computer program instructions and executing in the memory of one or more of the computers. The instructions upon execution ingest unstructured data and process the ingested data to produce a semantic model stored as a collection of triples in the memory. The instructions further apply a statistical analysis to a set of structured data to produce a statistical model stored as a collection of triple or tuples in the memory and apply one or more reasoners to the semantic model and the statistical model in order to generate data in the wide table database. Of note, at least one of the reasoners converts the triples of the semantic model into associated triples by adding a new column to the wide table database in response to detecting a new predicate for a subject already present in one of the rows of the wide table database so that the new predicate is stored in the new column in a new row created for the subject already present. Finally, the instructions process queries against the wide table database as received in a user interface to the wide table database.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for the scalable high level integration of structured and unstructured data. In accordance with an embodiment of the invention, unstructured data in one or more data stores is statistically processed to produce one or more statistical models based on entity extraction techniques from textual data. Concurrently, structured data is ingested for term extraction and processed into one or more semantic models representing the underlying schema of the database, and the extracted terms are then mapped to a collection of RDF triples. Thereafter, a multiplicity of different reasoners are applied to both the semantic models and the statistical models in order to populate a knowledge graph containing both base information as well as inferred information. The graph is then converted into the wide table database representing the information contained in the triples of the knowledge graph. In particular, RDF triples present in the semantic models are broken into component parts in order to be accurately mapped against the wide table database, thereby creating a new index of the underlying data, based on the explicitly defined relationships of entities from within the graph. Augmenting the number of columns of the wide table database is required to accommodate new predicates present for a subject of an RDF triple. The addition of new predicates to the wide column table via the system presents a novel way to dynamically index the data inside the table. Finally, queries are received in a user interface to the wide table database in order to return result sets for complex (e.g., multi-hop graph-based) queries that represent complex patterns of information typically unavailable to search mechanisms across wide column stores.

Figure 1:
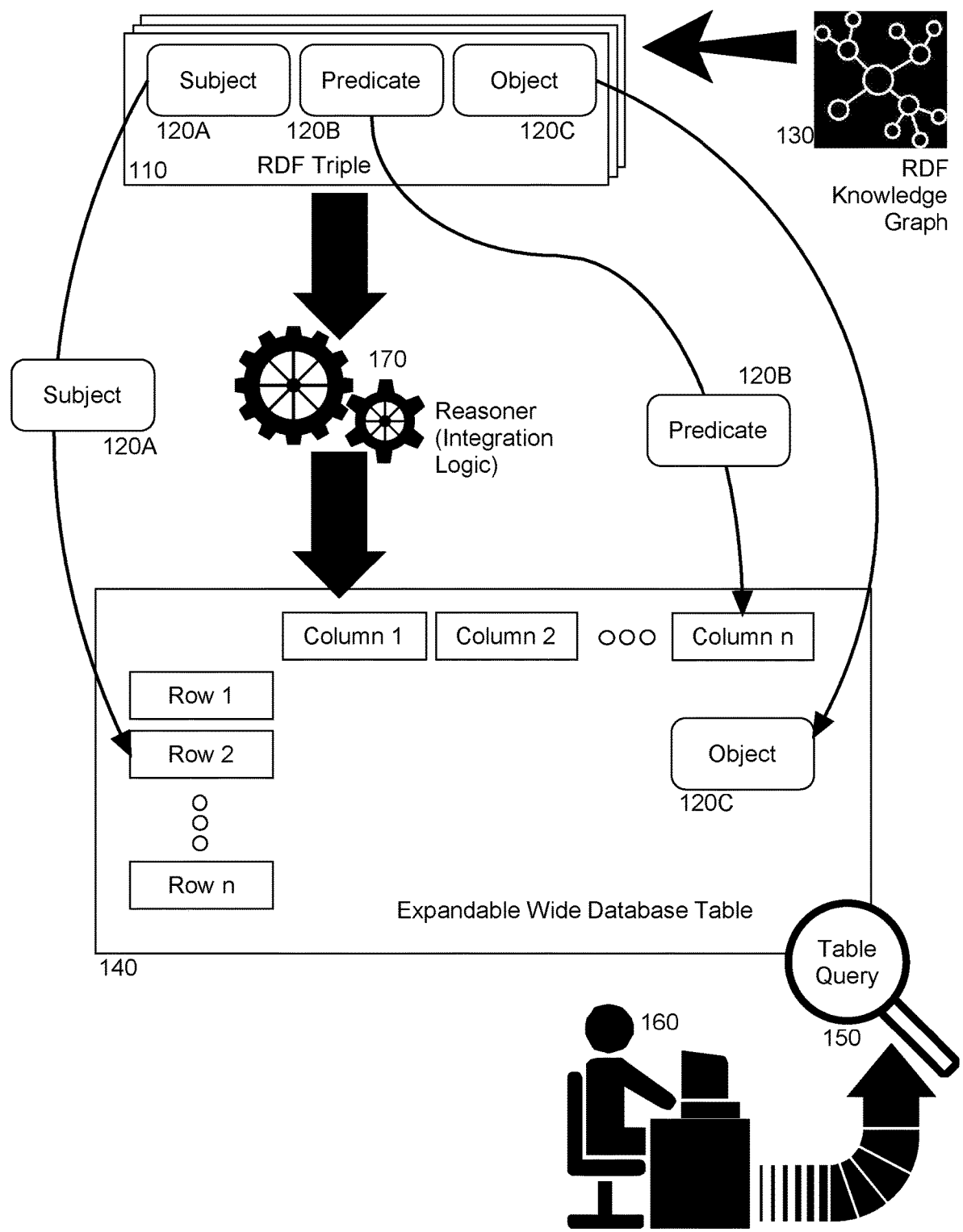
FIG. 1 is pictorial illustration of a process for the scalable high-level integration of structured and unstructured data.

In further illustration, FIG. 1 pictorially shows a process for the scalable high-level integration of structured and unstructured data. As shown in FIG. 1, an RDF knowledge graph 130 is produced through the ingestion or mapping of structured data along with the extraction of terms from unstructured data, for example by way of the statistical processing of the data. One or more reasoners are then applied in order to produce a set of RDF triples 110 each containing a subject 120A, predicate 120B and object 120C. One of the reasoners includes integration logic 170 is adapted to convert each of the RDF triples 110 into an expandable wide database table 140.

In this regard, the integration logic 170 for each RDF triple 110 locates in the expandable wide database table 140 a corresponding row utilizing the subject 120A of the RDF triple 110 as a key. Upon locating a corresponding row utilizing the subject 120A of the RDF triple 110 as a key, it is determined if a corresponding column of the expandable wide database table 140 includes a column heading corresponding to the predicate 120B of the RDF triple 110. If so, the value for the column entry for the row is updated to include the object 120C of the RDF triple 110. Queries of rows can thereby connect several predicates and objects to a given subject.

But, if a corresponding column heading cannot be located at the row for the predicate 120B of the RDF triple 110, the integration logic 170 expands the expandable wide database table 140 with a new column having a column heading corresponding to the predicate 120B and the integration logic 170 then inserts a new row into the expandable wide database table 140 to account for the subject 120A. Finally, a value is assigned to the inserted row at the new column to account for the object 120C. Thereafter, an end user 160 may conduct queries 150 against the expandable wide database table 140.

Figure 2:
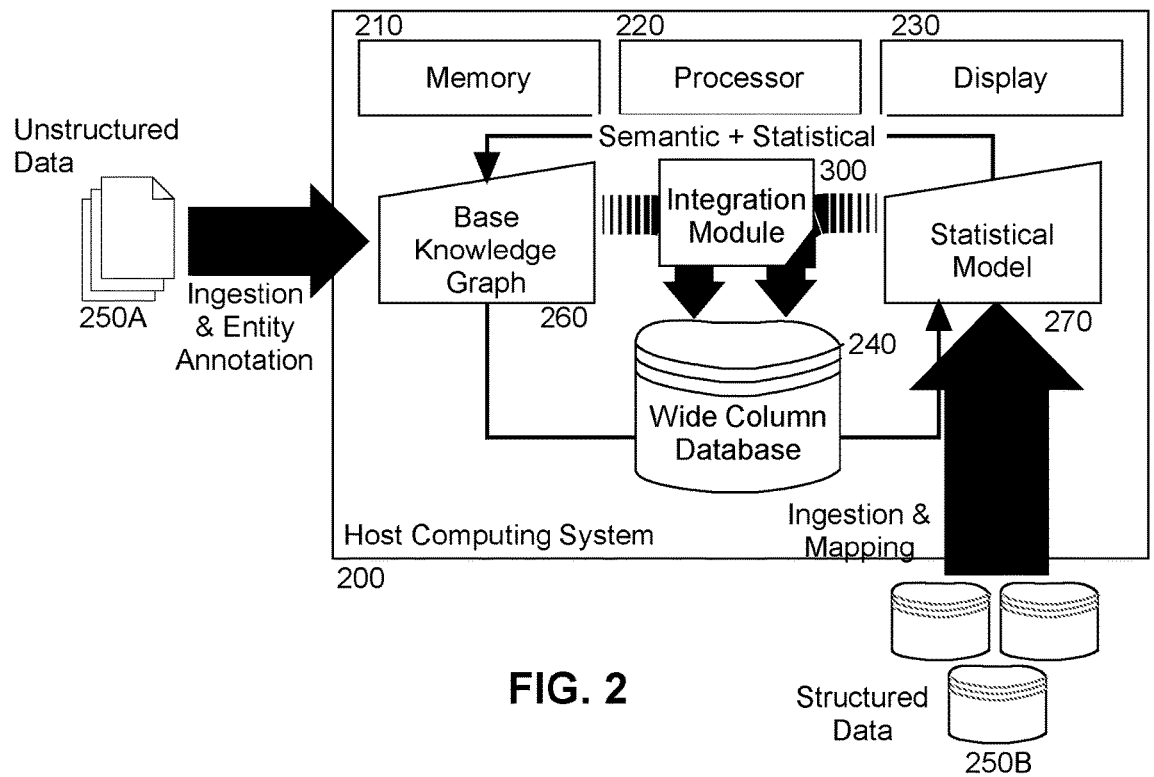
FIG. 2 is a schematic illustration of a data processing system configured for the scalable high level integration of structured and unstructured data; and, FIG. 3 is a flow chart illustrating a process for the scalable high level integration of structured and unstructured data.

The process described in connection with FIG. 1 may be implemented within a data processing system. In further illustration, FIG. 2 is a schematic illustration of a data processing system configured for the scalable high-level integration of structured and unstructured data. The data processing system includes a host computing system 200 that includes memory 210, at least one processor 220 and a display 230. The data processing system further includes an expandable wide database 240. Importantly, an integration module 300 is disposed within the host computing system 200 and includes program code that executes in the memory 210 of the host computing system 200.

Specifically, the program code of the integration module 300 is enabled during execution to ingest structured data 250B into a base knowledge graph 260. As well, the program code of the integration module 300 is enabled during execution to ingest unstructured data 250A into a statistical model 270. In this regard, the unstructured data 250A is ingested into a text extraction engine that can provide either or both of named entity recognition (NER) and natural language processing (NLP) in order to tag, label and extract important terms. Further, one or more database schemas for the structured data 250B can be mapped to the base knowledge graph 260 using any of manual mappings, the D2RQ platform or other techniques that allow for the semi-automated conversion of a schemas into an RDF-compliant graph.

Thereafter, the program code transforms text-based triples from the statistical model 270 into different records in the wide database 240. Likewise, the program code transforms triples of the base knowledge graph 260 into different records in the wide database 240. Optionally, the base knowledge graph 260 is intermediately processed into an inferred knowledge graph (not shown) through one or more reasoners inferring additional nodes from existing nodes of the base knowledge graph 260. More particularly, the base knowledge graph 260 may be augmented into an inferred knowledge graph with human conceptual information by way of both the use of manual steps for the insertion of facts into the inferred knowledge graph, and also the use of automated steps by way of the utilization of other ontology models.

For example, one or more semantic reasoners may be added to the base knowledge graph 260 in order to run rules of inference against the base knowledge graph 260. The reasoners apply any of description logic, common logic, object logic, first order predicate logic, and the like to the base knowledge graph 260 in order to generate new triples, each with a new subject, predicate and object, thereby increasing the expressiveness and computational use-value of the base knowledge graph 260 in the inferred knowledge graph. Thereafter, the base knowledge graph 260 and the inferred knowledge graph remain separate from one another, due to the more permanent nature of the base knowledge graph 260 which represents observed facts, whereas the inferred knowledge graph represents inferred facts, dependent upon the rules and logical premises set forth in the semantic reasoners.

Notably, a search engine then scans the inferred knowledge graph in order to retrieve triples of the inferred knowledge graph for placement into a wide table of the database 240 as new columns. In particular, the program code of the integration module 300 transforms each of triples into the different records of the wide table of the database 240 by utilizing a subject of the triple as a key to locate an existing record in the wide table of the database 240. To the extent that no record exists for the key, a new record is created with the subject as the key. The program code then determines if a column heading in the wide table of the database 240 exists for the predicate of the triple. If so, a value is written for that column and new record corresponding to the object of the triple. Otherwise, the program code adds a new column to the wide table of the database 240 and labels the new column with the predicate of the triple and writes a value for that new column and new record corresponding to the object of the triple.

To the extent that initially an existing row is located for the subject of the triple in the wide table of the database 240, the program code then determines if a column heading in the wide table of the database 240 exists for the predicate of the triple. If so, a value is written for that column and the located record corresponding to the object of the triple. Otherwise, the program code adds a new column to the wide table of the database 240 and labels the new column with the predicate of the triple and writes a value for that new column and located record corresponding to the object of the triple.

Figure 3:
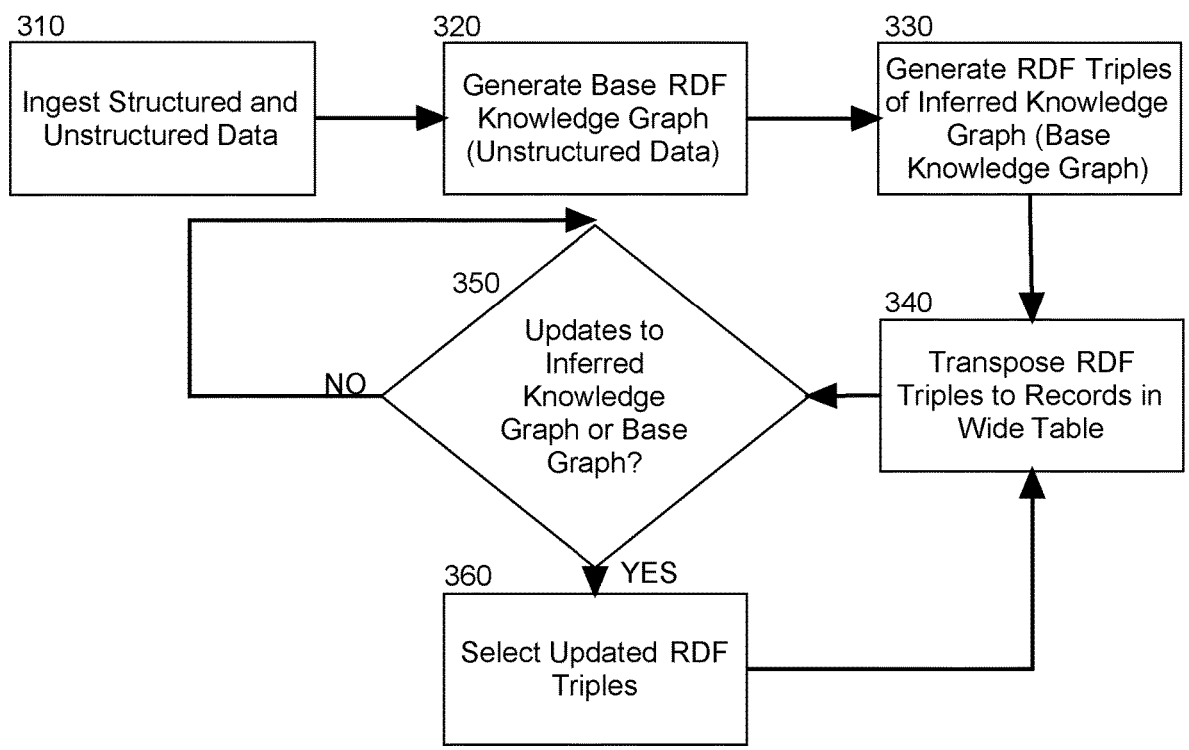

In even yet further illustration of the operation of the integration module 300, FIG. 3 is a flow chart illustrating a process for the scalable high-level integration of structured and unstructured data. Beginning in block 310, structured and unstructured data is ingested for generation in block 320 of an RDF knowledge graph. For unstructured data, extracted terms are mapped from text to the knowledge graph. Structured data from existing database sources, such as table names, column headers, primary keys, foreign keys, and the like, are ingested and mapped to the knowledge graph. In block 330, different RDF triples are then inferred utilizing different reasoners in order to produce an inferred knowledge graph. Then, in block 340, each of the RDF triples is transposed into a corresponding record of a table in the wide database. In decision block 350, it is determined if any updates have occurred in the inferred knowledge graph or base graph. If so, in block 360, RDF triples corresponding to the updates to the inferred or base knowledge graphs are selected and transposed in block 340 into the table in the wide database.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method of scalable high-level integration of structured and unstructured data comprising:
    ingesting, by a processor of a computer data processing system, unstructured data and processing the ingested unstructured data to produce a statistical model for term extraction that is then mapped to a collection of resource description framework (RDF) triples in a memory of a computer data processing system;
    ingesting, by the processor of the computer data processing system, structured data and processing the ingested structured data to produce a semantic model of a database schema, and storing the semantic model as a collection of RDF triples in the memory of the computer data processing system;
    applying, by the processor of the computer data processing system, one or more reasoners to the semantic model and the statistical model, in order to populate a knowledge graph containing both base information as well as inferred information and then to convert the populated knowledge graph into a wide table database of a multiplicity of rows and columns, each row storing a corresponding triple or tuple of information in a tabular format,
    at least one of one or more reasoners breaking the RDF triples of the semantic model into component parts in order to be accurately mapped against the wide table database, thereby creating a new index of data underlying the RDF triples of the semantic model, based on explicitly defined relationships of entities from within the knowledge graph,
    wherein the one or more reasoners transforms the knowledge graph into an inferred knowledge graph;
    wherein a search engine, by the processor of the computer data processing system, scans the inferred knowledge graph to retrieve triples of the inferred knowledge graph to place into the wide table database, wherein an integration module transforms the retrieved triples of the inferred knowledge graph by locating in the wide table database a corresponding row utilizing a subject the retrieved triples of the inferred knowledge graph as a key and upon locating the corresponding row, determining a corresponding one of the columns of the wide table database includes a column heading corresponding to a predicate of the retrieved triples of the inferred knowledge graph, wherein a value is written in a determined column and record corresponding to an object of the retrieved triples of the inferred knowledge graph, but otherwise expanding the wide table database with a new column having a column heading corresponding to the predicate of the retrieved triples of the inferred knowledge graph, wherein a value is written in the new column and a new record corresponding to the object of the retrieved triples of the inferred knowledge graph; and
    processing queries, by the processor of the computer data processing system, against the wide table database as received in a user interface to the wide table database, the processing of the queries returning respective query result sets.

2. The method of claim 1, wherein the wide table database is stored remotely from the computer data processing system from over a computer communications network.

3. The method of claim 1, wherein the ingested unstructured data is processed to produce the statistical model using natural language processing (NLP) extraction.

4. The method of claim 1, wherein the ingested unstructured data is processed to produce the statistical model using entity tagging.

5. The method of claim 1, wherein the ingested unstructured data is processed to produce the statistical model through the use of machine learning.

6. A computer data processing system adapted for scalable high-level integration of structured and unstructured data, the system comprising:
    a multiplicity of computers, each with memory and at least one processor;
    a database management system storing a wide table database of a multiplicity of rows and columns, each row storing a corresponding tuple; and,
    an integration module comprising computer program instructions and executing by the at least one processor in the memory of one or more of the computers, the instructions upon execution:
    ingesting unstructured data and processing the ingested unstructured data to produce a statistical model for term extraction that is then mapped to a collection of resource description framework (RDF) triples in the memory;

ingesting structured data and processing the ingested structured data to produce a semantic model of a database schema, and storing the semantic model as a collection of RDF triples in the memory;

applying one or more reasoners to the semantic model and the statistical model, in order to populate a knowledge graph containing both base information as well as inferred information and then to convert the populated knowledge graph into a wide table database of a multiplicity of rows and columns, each row storing a corresponding triple or tuple of information in a tabular format, at least one of one or more reasoners breaking the RDF triples of the semantic model into component parts in order to be accurately mapped against the wide table database, thereby creating a new index of data underlying the RDF triples of the semantic model, based on explicitly defined relationships of entities from within the knowledge graph, wherein the one or more reasoners transforms the knowledge graph into an inferred knowledge graph;

wherein a search engine scans the inferred knowledge graph to retrieve triples of the inferred knowledge graph to place into the wide table database, wherein an integration module transforms the retrieved triples of the inferred knowledge graph by locating in the wide table database a corresponding row utilizing a subject the retrieved triples of the inferred knowledge graph as a key and upon locating the corresponding row, determining a corresponding one of the columns of the wide table database includes a column heading corresponding to a predicate of the retrieved triples of the inferred knowledge graph, wherein a value is written in a determined column and record corresponding to an object of the retrieved triples of the inferred knowledge graph, but otherwise expanding the wide table database with a new column having a column heading corresponding to the predicate of the retrieved triples of the inferred knowledge graph, wherein a value is written in the new column and a new record corresponding to the object of the retrieved triples of the inferred knowledge graph; and processing queries against the wide table database as received in a user interface to the wide table database, the processing of the queries returning respective query result sets.

7. The system of claim 6, wherein the wide table database is stored remotely from the computer data processing system from over a computer communications network.

8. The system of claim 6, wherein the ingested unstructured data is processed to produce the statistical model using natural language processing (NLP) extraction.

9. The method of claim 6, wherein the ingested unstructured data is processed to produce the statistical model using entity tagging.

10. The method of claim 6, wherein the ingested unstructured data is processed to produce the statistical model using machine learning.

11. A computer program product for scalable high-level integration of structured and unstructured data, the computer program product including a non-transitory computer readable storage medium having program instructions embodied therewith, the program instructions executable by a processing device to cause the device to perform a method including:

ingesting unstructured data and processing the ingested unstructured data to produce a statistical model stored as extracted terms that are then mapped to resource description framework (RDF) triples in a memory of a computer data processing system;

ingesting structured data and processing the ingested structured data to produce a semantic model of a database schema, and storing the semantic model as a collection of RDF triples in the memory of the computer data processing system;

applying one or more reasoners to the semantic model and the statistical model, in order to populate a knowledge graph containing both base information as well as inferred information and then to convert the populated knowledge graph into a wide table database of a multiplicity of rows and columns, each row storing a corresponding triple or tuple of information in a tabular format, at least one of one or more reasoners breaking the RDF triples of the semantic model into component parts in order to be accurately mapped against the wide table database, thereby creating a new index of data underlying the RDF triples of the semantic model, based on explicitly defined relationships of entities from within the knowledge graph, wherein the one or more reasoners transforms the knowledge graph into an inferred knowledge graph;

wherein a search engine, by the processor of the computer data processing system, scans the inferred knowledge graph to retrieve triples of the inferred knowledge graph to place into the wide table database, wherein a integration module transforms the retrieved triples of the inferred knowledge graph by locating in the wide table database a corresponding row utilizing a subject the retrieved triples of the inferred knowledge graph as a key and upon locating the corresponding row, determining a corresponding one of the columns of the wide table database includes a column heading corresponding to a predicate of the retrieved triples of the inferred knowledge graph, wherein a value is written in a determined column and record corresponding to an object of the retrieved triples of the inferred knowledge graph, but otherwise expanding the wide table database with a new column having a column heading corresponding to the predicate of the retrieved triples of the inferred knowledge graph, wherein a value is written in the new column and a new record corresponding to the object of the retrieved triples of the inferred knowledge graph; and processing queries against the wide table database as received in a user interface to the wide table database, the processing of the queries returning respective query result sets.

12. The computer program product of claim 11, wherein the wide table database is stored remotely from the computer data processing system from over a computer communications network.

13. The computer program product of claim 11, wherein the ingested unstructured data is processed to produce the statistical model using natural language processing (NLP) extraction.

14. The computer program product of claim 11, wherein the ingested unstructured data is processed to produce the statistical model using entity tagging.

15. The computer program product of claim 11, wherein the ingested unstructured data is processed to produce the statistical model using machine learning.

\* \* \* \* \*